United States Patent [19]
Valyi

[11] 3,868,202
[45] Feb. 25, 1975

[54] APPARATUS FOR THE PRODUCTION OF COMPOSITE CONTAINERS

[76] Inventor: Emery I. Valyi, 5200 Sycamore Ave., Riverdale, N.Y. 10471

[22] Filed: Aug. 23, 1973

[21] Appl. No.: 390,725

Related U.S. Application Data

[63] Continuation-in-part of Ser. No. 211,898, Dec. 27, 1971, Pat. No. 3,816,580.

[52] U.S. Cl....... 425/242 B, 264/97, 425/DIG. 203, 425/DIG. 209, 425/DIG. 234
[51] Int. Cl............................................ B29d 23/03
[58] Field of Search............ 264/97, 89; 425/242 B, 425/324 B, 387 B, DIG. 203, DIG. 209, DIG. 234

[56] References Cited
UNITED STATES PATENTS

| | | | |
|---|---|---|---|
| 2,331,702 | 10/1943 | Kopitke | 425/DIG. 209 |
| 3,247,550 | 4/1966 | Haines | 264/89 X |
| 3,737,259 | 6/1973 | Valyi | 425/DIG. 209 |

Primary Examiner—Andrew R. Juhasz
Assistant Examiner—Z. R. Bilinsky
Attorney, Agent, or Firm—Robert H. Bachman

[57] ABSTRACT

Apparatus for the production of composite containers by blow molding wherein an inner preformed liner is applied to a core without immediate direct contact with the heated portions of the core.

12 Claims, 8 Drawing Figures

6,868,202

APPARATUS FOR THE PRODUCTION OF COMPOSITE CONTAINERS

CROSS REFERENCE TO RELATED APPLICATIONS

This application is a continuation-in-part of copending application Ser. No. 211,898 by Emery I. Valyi, filed Dec. 27, 1971, now U.S. Pat. No. 3,816,580.

BACKGROUND OF THE INVENTION

This invention relates to an apparatus for use with liners intended to provide an inner layer of injection blow molded parisons. Parisons containing such inner layers are used for the production of composite hollow articles, such as containers, as more fully described in my U.S. Pat. Nos. 3,717,544 and 3,719,735 according to which previously formed sleeve-like liners are applied to the blow core of an injection blow molding apparatus, plastic is injected around said liners while upon the cores and the resultant composite parison, consisting of the liner and the injected plastic, is expanded together into conformance with a blow mold. The method of injection blow molding is well known and described, for example, in U.S. Pat. No. 3,029,468 and other patents.

SUMMARY OF THE INVENTION

The invention relates to the manufacture of plastic articles composed of two or more components. According to my above-named U.S. Pat. Nos. 3,717,544 and 3,719,735, a liner, whose shape conforms to that of the blow core, is produced by one of several possible methods, depending on the size and shape of such liner and upon the material from which it is to be made. For example, liners may be made by electrostatic deposition, by coating in a fluidized bed, by pressure molding, by blowing or by forming from sheet stock.

Several of these procedures for the making of liners entail severe deformation of the plastic at elevated temperature, under conditions rendering the production of stress-free liners frequently virtually impossible. As is well known, such stressed articles cannot withstand being heated subsequent to the forming process to which they have been subjected, without exhibiting severe deformation. For example, liners made from sheet stock, as by thermoforming, will tend to shrink and even shrivel up, if heated to a temperature approaching that at which they were previously formed.

As described in my patents previously referred to, the cores onto which liners are applied must usually be heated, at times to a temperature near that used for injecting plastic around them, in order to heat the liners quickly and uniformly to the temperature at which they are to expand as part of the parisons.

It is therefore difficult to apply liners that tend to deform upon contact with a heated surface, without causing such deformation to take place before there is time to inject plastic around the liners.

It is an object of the invention to provide an apparatus for the application of liners without experiencing liner distortion even when heated cores are used.

Another object is to provide apparatus as above which may be utilized in connection with conventional injection blow molding tools and machines.

In accordance with one embodiment of the present invention, the liners are applied to the cores in two stages. In the first stage, the liners are placed into the immediate proximity of the cores, by means of a spacer which may be formed by a mold component such as a neck-mold, in such a way that they are held in an accurate predetermined spatial relationship with the cores, but at a sufficient distance from the heated portions of the core surfaces to preclude direct transfer of heat by conduction from the cores to the liners. In the second stage, the liners are forced into full contact with the cores, resulting in conductive heat transfer from one to the other, whereby such contact is established only as the molten plastic is pressed around the liners of at least at such short an interval of time before that moment that the liner cannot shrink or otherwise deform, between the time of its contact with the core and the time it is surrounded by the entering molten plastic.

According to another embodiment of the present invention, the cores are provided with at least one region that is maintained at a temperature which is lower than the deformation temperature of the liners. Therefore the liners remain undeformed in the corresponding areas of contact with the core and are thereby made capable of resisting unwanted deformation.

BRIEF DESCRIPTION OF DRWINGS

The nature of the invention will be better understood from the following description taken in connection with the accompanying drawings in which FIG. 1 is an elevation, partly in section, of an injection blow molding apparatus including a parison mold and a blow mold, in schematic representation;

DETAILED DESCRIPTION

Figure 1:
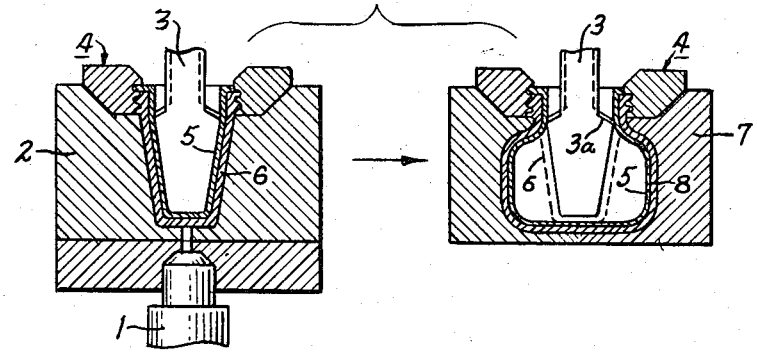

Referring to the drawings in more detail, an injection blow molding apparatus is shown in FIG. 1 for the purpose of identifying the process steps and the several functional parts of that apparatus. An injection nozzle 1 is provided to furnish molten plastic at high pressure to the parison mold assembly, consisting of parison mold 2, blow core 3 and neck-mold 4.

In operation, a previously produced liner 5 having a shape conforming to the shape of blow core 3 is applied to the blow core which is then clamped together with the parison mold 2 and the neck-mold or spacer 4 with sufficient force to withstand the pressure of the plastic which is immediately thereafter caused to enter the parison mold through nozzle 1, thereby forming parison 6. The means for clamping the parison mold assembly and for providing molten plastic under pressure are well known and not shown here.

After producing of the composite parison as above described, the blow core 3 and the neck-mold 4 carry the parison 6 into a blow mold 7. Naturally, the parison may be formed on a core and transferred for blowing to a blow mold assembly at a later time. The blow mold assembly thus formed, consisting of the blow mold 7, blow core 3 and neck-mold 4 is now clamped together by known means (not shown) and fluid pressure e.g. air is applied inside the parison 6 through a blow valve or blow slot 3a. Since the blow core is usually heated by internal means (not shown in FIG. 1), such as by hot fluid circulation, or electrically, and due to the heat transmitted by the freshly injected hot plastic, the liner 5 will have assumed a sufficiently high temperature for expanding in unison with the injected portion of the parison 6. The finished article 8 is thus formed in the blow mold, having an inner and outer layer, the former being the liner 5 in expanded form. The article 8 is next removed and the several elements of the apparatus are available for the next cycle. As is known, the parison mold 2, the blow mold 7 and the neck-mold 4 may be made of a single piece, or consist of several pieces that are movable relative to each other, in order to facilitate removal of the finished article. Whenever that is the case, appropriate actuators for the respective pieces are provided, as is customary. The blow slot 3a is usually closable, and if so, the blow core 3 consists of at least two parts, the poppet 3b and the sleeve 3c which may be moved relative to each other in order to open and close the blow slot 3a by conventional means, not shown.

Figure 2:
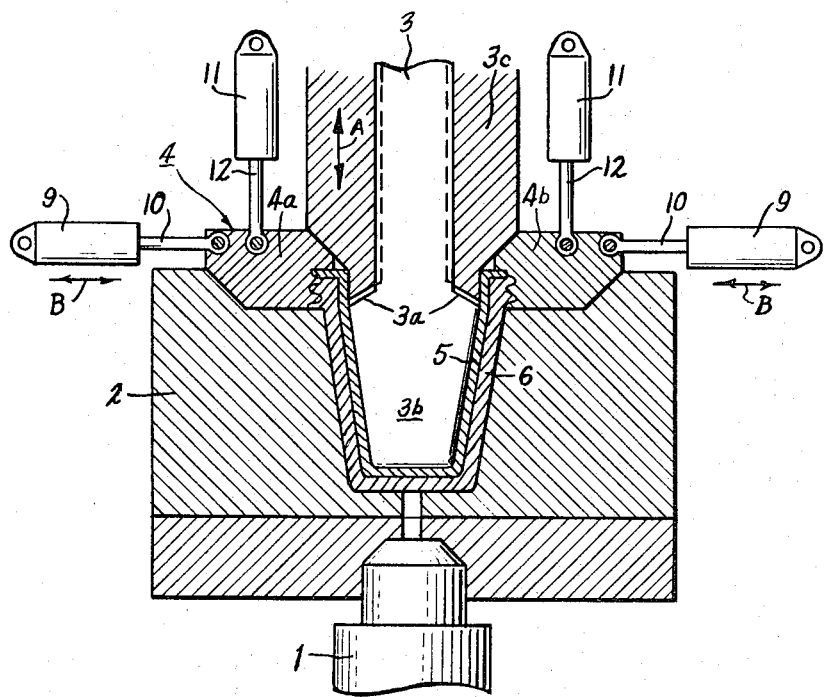
FIG. 2 is an enlarged view of the parison mold assembly showing further details of the neck-mold actuating devices.

An enlarged view of the parison mold assembly in the parison molding position is shown in FIG. 2, in which like numerals designate like parts as in FIG. 1. Blow slot 3a is shown in open position in FIG. 2, in which apparatus for the actuation of the neck-mold 4 is also shown. According to FIG. 2, the neck-mold 4 is intended to produce a neck having external threads which can be removed from the neck-mold only by separating neck-mold halves 4a and 4b. In other instances, as for example if the neck or top of the article to be made has the shape of a bead, such separation is not necessary and the neck-mold may be of single-piece construction. In order to separate and close the neck-mold halves 4a and 4b, conventional hydraulic cylinders 9 are provided actuated by a known pump and valve assembly, not shown. These cylinders engage the neck-mold halves by means of piston rods 10 and thereby enable cylinders 9 to actuate the neck-mold halves 4a and 4b in the direction of arrow B in FIG. 2. The neck-mold assembly is moreover connected to the cylinders 11 by means of piston rods 12, thereby providing means for moving the neck-mold assembly in the directions of Arrow A in FIG. 2.

The position of the parison assembly according to FIG. 2 corresponds to the point in the operating cycle of the apparatus which follows immediately after injection of plastic through nozzle 1, all components of the assembly being shown in the clamped condition and the parison mold 2 containing the composite parison consisting of liner 5 and parison portion 6 which has been injected around the liner.

Figure 3:
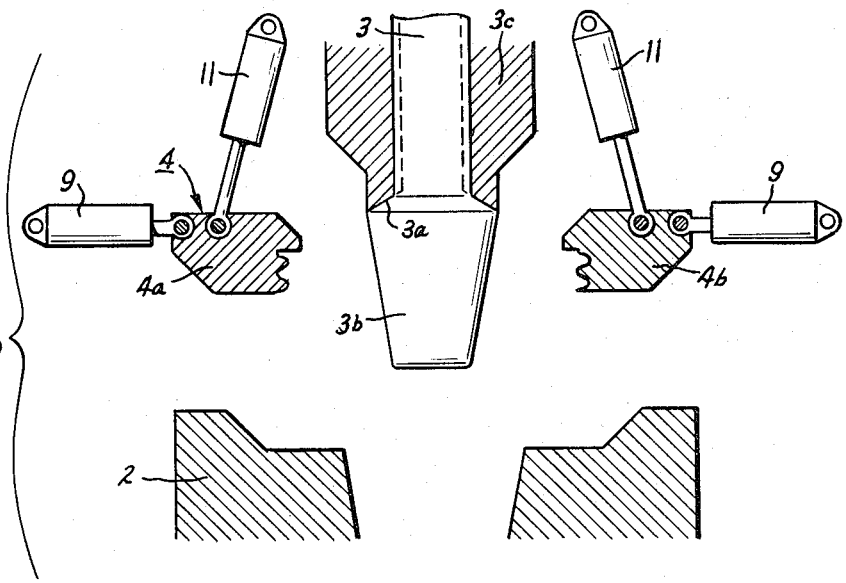
FIG. 3 shows the assembly according to FIG. 2 before the introduction of a liner.

In further operation, the parison is transferred to the blow mold, is blown, the resulting finished article 8 removed and the parts necessary to complete the parison assembly, namely blow core 3 and neck-mold 4 with their corresponding actuators, are returned into alignment with the parison mold 2, as shown in FIG. 3, preparatory to being clamped together therewith.

In accordance with the present invention, a preformed liner is positioned in the neck mold while the blow core is at least partially retracted from the neck mold, or conversely while the neck mold is at least partially advanced from its seated position around the blow core. It is understood that the terms "advanced" and "retracted" are used herein to refer to relative movement between the respective parts and that either of the parts may be moved with respect to the other in order to effect the desired relative displacement.

Figure 4:
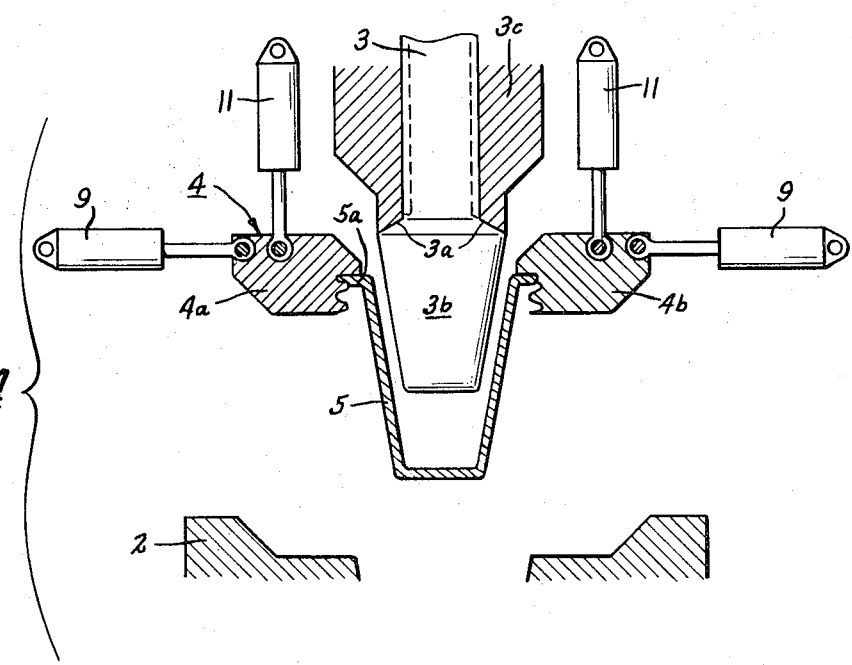
FIG. 4 shows the assembly according to FIG. 3 after introduction of a liner and with the blow core partially inserted in the process of closing the mold for molding the parison.

While the liner is positioned in the neck mold with the blow core retracted as above described, the surface of the blow core is spaced from the liner due to the tapered contour of the parts. The blow core, neck mold and liner are then advanced axially into the parison mold while retaining the parts in the same relative, spaced position until the neck mold reaches its seated position in the parison mold. When this occurs, the liner is fully introduced into the parison mold and further movement of the neck mold and liner is stopped. The blow core, however, continues its movement into the parison mold and into the liner. The liner thus comes into full surface contact with the blow core only at the instant at which the blow core becomes fully seated and in molding position. Heat transfer from the hot blow core to the liner is thus retarded until the parts are seated and plastic injection begins. The liner is thus not heated to a point at which it would tend to shrink on the blow core until it comes in contact with both the blow core and the injected plastic, at which point the pressure of the injected plastic holds the liner in place and prevents relative movement with respect to the blow core. FIG. 3 shows the neck-mold halves 4a and 4b separated for receiving the liner and also advanced from its seated position with respect to the blow core in the direction of arrow A (FIG. 2), under the action of cylinders 11. In further operation the neck-mold halves 4a and 4b are closed again, but the neck-mold assembly remains spaced away from the blow core assembly as shown in FIG. 4. Liner 5 is now positioned by external means (not shown) into alignment with blow core 3 and it is advanced until the top rim 5a of liner 5 is in position to be carried by the corresponding surface of the neck-mold. For that purpose the neck-mold may be closed and the liner rims 5a or selected portions thereof, if made of comparatively flexible material, are caused by the external positioning device to snap over interfering portions of the neck mold such as, for example, the thread contours shown in FIG. 4. Another procedure for that purpose is to leave the neck-mold halves 4a and 4b separated until the external positioning device will have placed the liner 5 into a position such that, upon closing of the neck-mold halves 4a and 4b, the liner rim 5a will rest upon the neck-mold, as before. Other means for retaining the liners upon the neck-mold may be brought about by suitable design of the matching surfaces, the neck-mold 4 and blow core sleeve 3c.

For purposes of injection blow molding, the blow core poppet 3b is heated to a temperature which depends on the material being molded and which may reach 400° F. The parison mold 2 is also heated, to a temperature usually below that of the blow core poppet.

The blow core sleeve 3c is usually cooled by fluid circulation or by air, as is the neck-mold 4.

Accordingly, in operation as shown in FIG. 4, the liner 5 is positioned in such a manner that it is spaced from the heated portions of the blow core assembly.

In the method described, the liner 5 may be accurately positioned for its intended location in the parison mold assembly without touching the heated portions of the blow core 3 until the very instant of closing of the parison mold assembly which can be arranged to occur a fraction of a second before the injection step. Liner 5 is then brought into contact with the blow core poppet 3b as relative movement of the parison mold 2 and the neck mold 4 and core sleeve 3c urges the neck mold 4 - which carries liner 5 - into contact with blow core sleeve 3c, as shown in FIG. 1.

Figure 5:
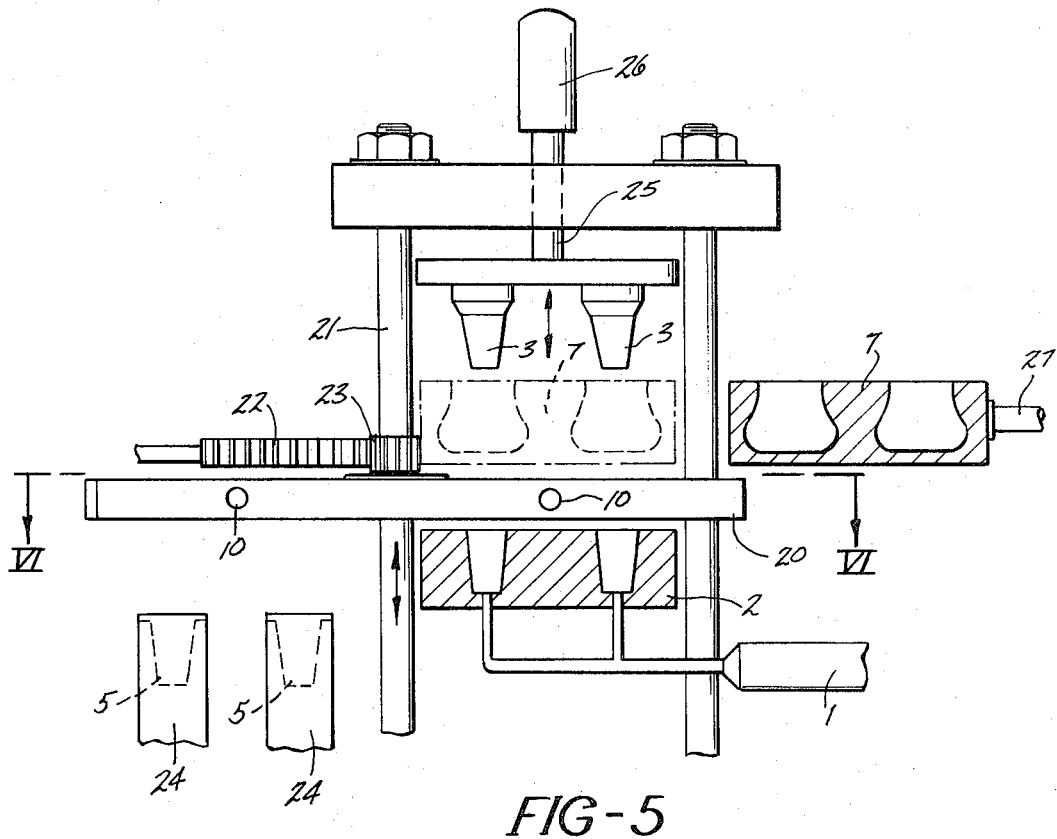
FIG. 5 is an elevation, partly in section, of another embodiment of the present invention.
Figure 6:
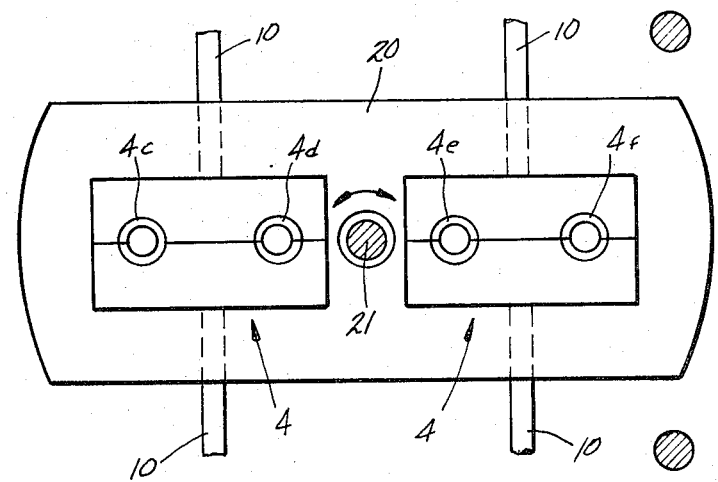
FIG. 6 is a section taken on the line VI—VI of FIG. 5.

Another procedure is shown in FIGS. 5 and 6 in which is rotatable platen 20 which may be rotated or oscillated or shifted sideways around shaft or pivot 21 by suitable means, such as by rack 22 acting upon pinion 23 moving in the direction of the arrow, which shaft also serves to guide platen 20 in its movements parallel to the axis of the neck molds 4. Platen 20 carries multiple neck rings 4. Thus, neck rings 4c, 4d, 4e and 4f are mounted on platen 20 and are actuated for opening and closing by means of piston rods 10 connected to their respective cylinders (not shown). As shown in FIG. 5, when one set of neck molds 4e and 4f is in alignment with the parison mold 2 and blow cores 3, the other set of neck molds 4c and 4d is in alignment with liners 5 furnished from magazines 24. In operation, platen 20 is moved downward in the direction of the arrow whereby the liners which are carried by neck molds 4e and 4f are inserted in parison mold 2. Blow cores 3 are also moved downward by piston rod 25 and piston 26 and continue their movement into the parison mold 2. In the course of these two movements the sleeve may reach the parison mold before the blow core as previously described. Alternatively, the core and liner may come into contact in the course of their rapid movement towards the parison mold and are placed therein together. The parison is then molded around the blow cores within the parison mold and the assembly, consisting of platen 20 and the two blow cores 3, is raised. A blow mold 7, as previously described and shown in dashed lines, is now brought into juxtaposition with the blow cores by means of shaft 27 connected to a cylinder (not shown). The blow mold with the finished article is removed from the blow core and the assembly, consisting of platen 20 and the neck molds 4, is rotated around rod 21 in the direction of the arrow so as to align the neck molds 4e and 4f to recieve the next liners 5 and to align the neck molds 4c and 4d carrying liners with the parison mold 2. Since the time used to mold parisons in one position is also used to apply liners in the other position, no time is spent for the application of the liners in excess of the time normally needed for parison production.

A particular type of molding apparatus including a plurality of neck molds and blow cores has been illustrated in FIG. 5. However, it is understood that the invention may be applied to various types of molding apparatus including two or more neck molds which are mounted to be shifted between successive stations by suitable means, for example, by rotation. Various types of such apparatus involving a first station where the parison is injected, a second station where the parison is blown, and a third station where the blown article is discharged are well known in the art. Examples are shown in U.S. Pat. Nos. 3,183,552, 1,100,913, 3,339,231 and 3,480,993. It is obvious that in such apparatus the liner may be applied to the neck mold at a station in advance of the station wherein the parison is injected.

Figure 7:
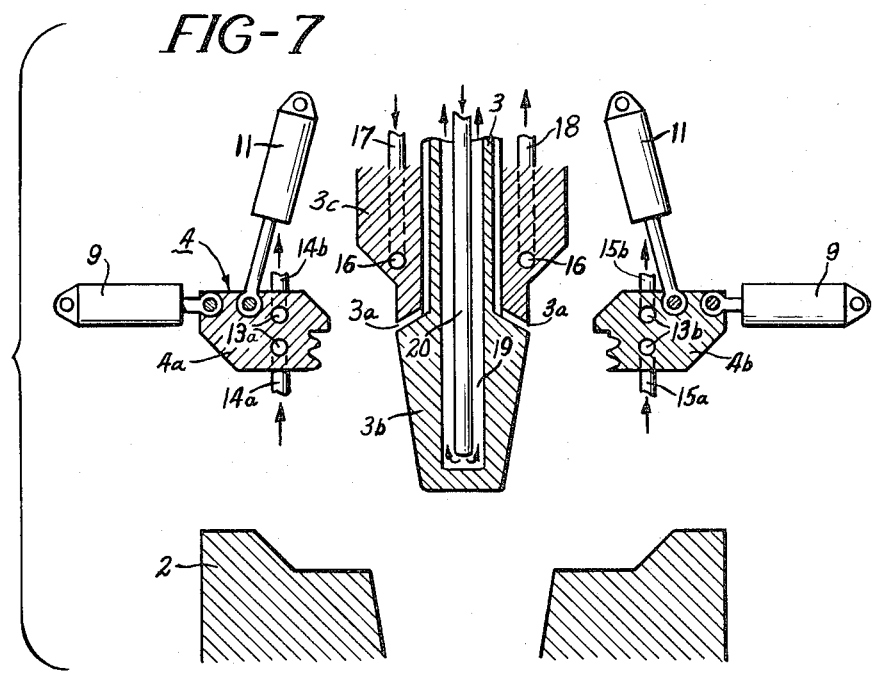
FIG. 7 shows an assembly according to FIG. 2 having temperature control means.
Figure 8:
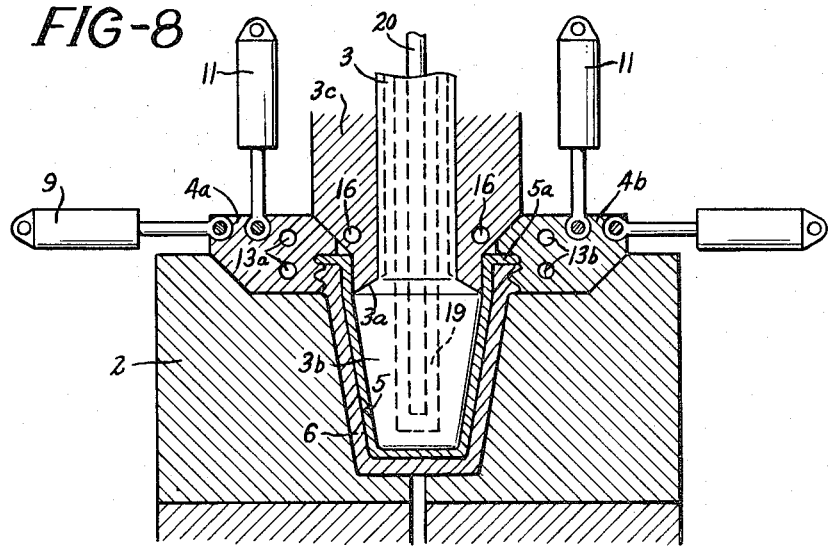
FIG. 8 shows an assembly according to FIG. 7 with the blow slot closed.

An arrangement of temperature control means is shown in FIGS. 7 and 8 in which fluid cooling of the neck mold 4a and 4b is provided through channels 13a and 13b into which the cooling fluid, usually water, is caused to flow through tubes 14a and 14b; and 15a and 15b respectively, in the direction of the arrows. Blow core sleeve 3c is cooled by means of fluid circulating through channel 16 flowing into that channel through conduit 17 and out of the channel through conduit 18. The blow core poppet 3b is heated by fluid entering through tube 20 into cavity 19 and flowing through that cavity as indicated by arrows.

Another procedure for applying liners is, accordingly, to provide a substantial difference between the temperatures of the blow core poppet 3b and the blow core sleeve 3c. Due to the fact that the two blow core components are in contact particularly also at the surfaces that are to form the blow slot 3a, heat is transmitted from one to the other, tending to heat blow core sleeve 3c to a temperature sufficient to deform liner 5. In order to maintain the temperature of the blow core poppet 3b at the desired low level, the blow slot 3a is opened as shown in FIG. 5 prior to the application of the liner 5 and kept open substantially throughout the molding cycle, except at the stage of pressure molding. During that stage, shown in FIG. 8, the blow slot 3a is closed by external means (not shown) or by the pressure of the plastic supplied from injection nozzle 1. Accordingly, the contact between the blow core sleeve 3c and blow core poppet 3b is minimized and the desired low temperature of the sleeve is thereby readily maintained.

In some instances, depending upon the nature of the material employed, distortion of the liner may be avoided by clamping the neck portion of the sleeve against the relatively cool sleeve which thereby maintains the neck portion at a temperature suited to provide the necessary strength or rigidity for holding the neck portion in place and thereby opposing the forces tending to produce distortion in the more highly heated portion of the liner. In such cases, the transfer of heat from the poppet to the sleeve may be reduced by maintaining the blow slot open and the sleeve spaced from the heated surface of the poppet. If it is found that this procedure is not sufficient to prevent undesired distortion of the liner, the liner may be maintained in spaced relationship with the hot poppet until the point of injection of the plastic as described above.

While the procedure of separating the two blow core components for the purpose of improved temperature control has been described in connection with the use of liners, such procedure may be used advantageously regardless of the simultaneous employment of liners such as in normal injection blow molding carried out according to known procedures, whenever the products to be injection blow molded can benefit from a difference between the cooling rates of different portions of the molded article.

As the plastic layer cools and shrinks around the liner on the blow core, the two layers are held in close contact throughout their entire contacting areas. While they are still at a temperature suited for blowing, the blow core with the composite parison thereon is introduced into the blow mold and the parison is blown into the shape of the finished article. The liner and the plastic layer are expanded together and retain their intimate contact in the blown article.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. Apparatus for blow molding composite plastic articles comprising a parison mold, a core on which a parison is molded in said mold, a spacer adapted to carry a liner and means causing relative movement of said core, spacer and parison mold in a molding cycle for molding the parison, means applying a preformed liner to said spacer, means for axially aligning said spacer carrying said liner with the parison mold while maintaining said liner spaced in proximity from said core, means to contact said core with said liner, means placing said core, and said liner in contact with said parison mold into molding position, and means introducing plastic into said parison mold to form a composite parison.

2. Apparatus as set forth in claim 1 in which said spacer is a neck mold.

3. Apparatus as set forth in claim 2 in which said neck mold is formed in at least two parts.

4. Apparatus as set forth in claim 1 in which said core is a blow core.

5. Apparatus as set forth in claim 2 in which said neck mold is adapted to contact the neck portion of said liner with a portion of said core.

6. Apparatus as set forth in claim 5 in which said portion is cooled.

7. Apparatus as set forth in claim 1 in which the relative movements of said core, said parison mold, said liner and said spacer take place in an axial path.

8. Apparatus according to claim 1 including a plurality of parison molds, cores and spacers.

9. Apparatus according to claim 1 including means for shifting said spacer from a liner receiving position to a molding position.

10. Apparatus according to claim 9 wherein said means for shifting rotates said spacer.

11. Apparatus according to claim 1 wherein said means for applying a preformed liner to said spacer includes a magazine for holding said liners.

12. Apparatus according to claim 1 including means to bring said liner into alignment with said core.

* * * * *